(12) United States Patent
Claessens et al.

(10) Patent No.: US 12,353,020 B2
(45) Date of Patent: Jul. 8, 2025

(54) OPTICAL FIBER ADAPTER MOUNTING DEVICES

(71) Applicant: CommScope Technologies LLC, Hickory, NC (US)

(72) Inventors: Bart Mattie Claessens, Hasselt (BE); Roger Joseph Alaerts, Langdorp (BE)

(73) Assignee: CommScope Technologies LLC, Hickory, NC (US)

( * ) Notice: Subject to any disclaimer, the term of this patent is extended or adjusted under 35 U.S.C. 154(b) by 319 days.

(21) Appl. No.: 18/043,426

(22) PCT Filed: Aug. 25, 2021

(86) PCT No.: PCT/US2021/047566
§ 371 (c)(1),
(2) Date: Feb. 28, 2023

(87) PCT Pub. No.: WO2022/046917
PCT Pub. Date: Mar. 3, 2022

(65) Prior Publication Data
US 2023/0393346 A1 Dec. 7, 2023

Related U.S. Application Data

(60) Provisional application No. 63/072,626, filed on Aug. 31, 2020.

(51) Int. Cl.
*G02B 6/36* (2006.01)
*G02B 6/38* (2006.01)
(52) U.S. Cl.
CPC ......... *G02B 6/3825* (2013.01); *G02B 6/3897* (2013.01)
(58) Field of Classification Search
CPC ....... G02B 6/3825; G02B 6/3897; G02B 6/36
See application file for complete search history.

(56) References Cited

U.S. PATENT DOCUMENTS 4,765,710 A 8/1988 Burmeister et al.
6,227,718 B1 5/2001 Harvey et al.
(Continued)

FOREIGN PATENT DOCUMENTS

CN 110082866 A 8/2019
EP 2312355 B1 4/2011
(Continued)

OTHER PUBLICATIONS

International Search Report for PCT/0S2021/047566 mailed Dec. 15, 2021.

(Continued)

*Primary Examiner* — Jennifer Doan
(74) *Attorney, Agent, or Firm* — Merchant & Gould P.C.

(57) ABSTRACT

An optical fiber adapter mounting device includes a mounting plate and a plurality of adapter holders. The mounting plate includes a base, a first sidewall and a second sidewall, and a plurality of mounts defined by the base and disposed between the first sidewall and the second sidewall. Each of the plurality of adapter holders are pivotally coupled to the mounting plate at a corresponding mount and configured to support an optical fiber adapter. Each of the plurality of adapter holders include a platform having a first end pivotally coupled to the corresponding mount and a second end. The platform is pivotable between at least a first position, whereby the platform is disposed substantially parallel to the base, and a second position, whereby the second end is raised relative to the base. A frame is disposed at the second end and defines a chamber that receives the optical fiber adapter.

24 Claims, 10 Drawing Sheets

(56) References Cited

U.S. PATENT DOCUMENTS

| | | | |
|---|---|---|---|
| 6,227,885 | B1 | 5/2001 | Raviv et al. |
| 6,709,168 | B2 | 3/2004 | Imabayashi et al. |
| 7,802,926 | B2 | 9/2010 | Leeman et al. |
| 8,313,247 | B2 | 11/2012 | Vastmans et al. |
| 8,657,504 | B2 | 2/2014 | Wang et al. |
| 9,297,962 | B2 * | 3/2016 | Lee .................... G02B 6/3825 |
| RE46,780 | E | 4/2018 | Anderson et al. |
| 10,718,911 | B2 * | 7/2020 | Chang .................... G02B 6/403 |
| 2002/0025718 | A1 | 2/2002 | Cabalka et al. |
| 2002/0064348 | A1 | 5/2002 | Ngo |
| 2007/0047893 | A1 | 3/2007 | Kramer et al. |
| 2008/0253730 | A1 | 10/2008 | Cox et al. |
| 2010/0209050 | A1 | 8/2010 | Vastmans et al. |
| 2011/0268391 | A1 | 11/2011 | Wang et al. |
| 2018/0003913 | A1 | 1/2018 | Takeuchi et al. |
| 2018/0217338 | A1 * | 8/2018 | Takano .................. G02B 6/403 |
| 2023/0152545 | A1 | 5/2023 | Claessens et al. |

FOREIGN PATENT DOCUMENTS

| | | |
|---|---|---|
| EP | 2 490 056 B1 | 2/2016 |
| WO | 2009040568 A1 | 4/2009 |
| WO | 2013139622 A1 | 9/2013 |

OTHER PUBLICATIONS

Extended European Search Report for Application No. 21862664.6 mailed Jul. 26, 2024.

* cited by examiner

OPTICAL FIBER ADAPTER MOUNTING DEVICES

CROSS-REFERENCE TO RELATED APPLICATIONS

This application is being filed as a National Stage Application of PCT International Patent Application PCT/US2021/047566 filed on Aug. 25, 2021, and claims priority to and the benefit of U.S. Provisional Application No. 63/072,626, filed Aug. 31, 2020, the disclosures of which are incorporated herein by reference in their entireties.

BACKGROUND

Optical fiber connection apparatuses, such as junction boxes, facilitate physical connection of one or more optical fiber cables in an optical fiber transmission network. Optical fiber cables can be terminated at a connector that is utilized to align one or more optical fibers therein with another optical fiber cable and terminal connector. Optical fiber adapters are used to facilitate and support two connectors in alignment. These optical fiber adapters are mounted within the connection apparatuses and the devices that hold the optical fiber adapters should allow for connectors to be easily and smoothly inserted into and pulled out of the adapter, allow for compact arrangement of the adapter to reduce the size of the connection apparatuses, and allow for different types of adapters to be held so as to accommodate different connector and optical fiber cable types. For these and other reasons, improvements are desirable to the mounting devices that hold optical fiber adapters.

SUMMARY

Aspects of the present disclosure relate to optical fiber adapter mounting devices. In certain aspects, the devices include a mounting plate with a plurality of adapter holders pivotally coupled thereto. The mounting plate and adapter holders have components that increase the efficiency of the adapter holders being coupled to the mounting plate. Additionally, the components increase the strength of the device such that adapters and connectors are more efficiently installed into, and removed from, the device. Furthermore, the components facilitate a compact arrangement with increased performance of the pivotable movement of the adapter holders.

In an aspect, the technology relates to an optical fiber adapter mounting device including: a mounting plate including: a base; a first sidewall and an opposite second sidewall; and a plurality of mounts defined by the base and disposed between the first sidewall and the second sidewall, wherein each of the plurality of mounts include a hold down and a hook; and a plurality of adapter holders, wherein each of the plurality of adapter holders are pivotally coupled to the mounting plate at a corresponding mount of the plurality of mounts and configured to support an optical fiber adapter, wherein each of the plurality of adapter holders include: a platform including a first end, an opposite second end, and a cutout disposed between the first end and the second end; a dowel disposed at the first end, wherein both ends of the dowel are coupled to the platform such that a center portion of the dowel is spaced from the first end of the platform by a gap, wherein the hold down at least partially extends through the gap to pivotally engage the dowel such that the platform is pivotable between at least a first position, whereby the platform is disposed substantially parallel to the base, and a second position, whereby the second end is raised relative to the base, and wherein the hook is selectively receivable at least partially within the cutout when the platform is in the first position; and a frame disposed at the second end and defining a chamber that receives at least a portion of the optical fiber adapter.

In an example, the hold down includes a nose having a curved surface corresponding to the size and shape of the dowel. In another example, the nose and the hook extend in opposing directions. In still another example, the base further includes a post disposed between each of the plurality of mounts. In yet another example, the platform further includes at least one outer notch disposed between the dowel and the frame, and the at least one outer notch is configured to at least partially receive the post when the platform is in the first position. In an example, the frame includes a first wall having a lug, an opposite second wall having an arcuate slot, and a cross wall opposite of the platform, and adjacent adapter holders are slidably engaged with each other via the slot receiving at least a portion of the lug. In another example, the frame includes a first wall, an opposite second wall, and a cross wall opposite of the platform, and the platform and the cross wall each include an opening configured to receive a spring clip of the optical fiber adapter.

In another aspect, the technology relates to an optical fiber adapter mounting device including: a mounting plate including: a base; a first sidewall including a sidewall lug; a second sidewall including a sidewall arcuate slot; and a plurality of mounts defined by the base and disposed between the first sidewall and the second sidewall; and a plurality of adapter holders, wherein each of the plurality of adapter holders are pivotally coupled to the mounting plate at a corresponding mount of the plurality of mounts and configured to support an optical fiber adapter, wherein each of the plurality of adapter holders include: a platform including a first end pivotally coupled to the corresponding mount and an opposite second end, wherein the platform is pivotable between at least a first position, whereby the platform is disposed substantially parallel to the base, and a second position, whereby the second end is raised relative to the base; and a frame disposed at the second end and defining a chamber that receives at least a portion of the optical fiber adapter, wherein the frame includes: a first wall including a wall arcuate channel and a wall lug, wherein the wall lug is disposed at least partially within the wall arcuate channel; an opposite second wall including a wall arcuate slot having a wall raised lip extending at least partially around a perimeter of the wall arcuate slot, wherein between adjacent pairs of the plurality of adapter holders, the first wall is disposed adjacent the second wall, and the wall arcuate channel and wall lug are slidably engaged at least partially with the wall arcuate slot and the wall raised lip; and a cross wall opposing the platform.

In an example, the wall arcuate channel extends fully between the cross wall and the platform on the first wall. In another example, the wall arcuate channel has a depth that is substantially equal to an extension length of the wall raised lip. In still another example, the wall lug has an extension length that is greater than the depth of the wall arcuate channel. In yet another example, the first sidewall further includes a sidewall arcuate channel and the sidewall lug is disposed at least partially within the sidewall arcuate channel, and the sidewall arcuate channel and the sidewall lug are slidably engaged at least partially with the wall arcuate slot and the wall raised lip. In an example, the second sidewall further includes a sidewall raised lip extending at least partially around a perimeter of the sidewall arcuate slot, and the sidewall arcuate slot and the sidewall raised lip are slidably engaged at least partially with the wall arcuate channel and the wall lug.

In another example, the wall lug is elongated. In still another example, each mount of the plurality of mounts include a hold down, and the first end of the platform includes a dowel with a central portion spaced with a gap from the first end, the hold down is at least partially received within the gap to pivotally engage the dowel. In yet another example, the base further includes a post disposed between each of the plurality of mounts, and the platform includes at least one notch configured to at least partially receive the post when the platform is in the first position. In an example, the platform and the cross wall each include an opening configured to receive a spring clip of the optical fiber adapter.

In another aspect, the technology relates to an optical fiber adapter mounting device including: a mounting plate including: a base; a first sidewall and an opposite second sidewall; and a plurality of mounts defined by the base and disposed between the first sidewall and the second sidewall; and a plurality of adapter holders, wherein each of the plurality of adapter holders are pivotally coupled to the mounting plate at a corresponding mount of the plurality of mounts and configured to support an optical fiber adapter, wherein each of the plurality of adapter holders include: a platform including a first end pivotally coupled to the corresponding mount and an opposite second end, wherein the platform is pivotable between at least a first position, whereby the platform is disposed substantially parallel to the base, and a second position, whereby the second end is raised relative to the base; and a frame disposed at the second end and defining a chamber that receives at least a portion of the optical fiber adapter, wherein the frame includes a first wall, an opposite second wall, and a cross wall opposite of the platform, and wherein the platform and the cross wall each include an opening configured to receive a spring clip of the optical fiber adapter.

In an example, each mount of the plurality of mounts include a hold down, and the first end of the platform includes a dowel with a central portion spaced with a gap from the first end, the hold down is at least partially received within the gap to pivotally engage the dowel. In another example, the base further includes a post disposed between each of the plurality of mounts, and the platform includes at least one notch configured to at least partially receive the post when the platform is in the first position. In still another example, the first wall includes an arcuate channel and an elongated lug and the second wall includes an arcuate slot having a raised lip extending around a perimeter of the arcuate slot, and a pair of adjacent adapter holders of the plurality of adapter holders have the elongated lug and the arcuate channel slidably engaged at least partially with the arcuate slot and the raised lip. In yet another example, the first sidewall includes an arcuate channel and an elongate lug slidably engaged at least partially with the second wall, and the second sidewall includes an arcuate slot having a raised lip extending around a perimeter of the arcuate slot slidably engaged at least partially with the first wall. In an example, the first wall and the second wall each have a recessed portion and an extension portion that is configured to slidably engage with an adjacent adapter holder of the plurality of adapter holders. In another example, the openings are substantially rectangular in shape.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DESCRIPTION OF THE FIGURES

The following drawing figures, which form a part of this application, are illustrative of described technology and are not meant to limit the scope of the disclosure in any manner.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

One example of an optical fiber adapter mounting device is described in U.S. Pat. No. 8,657,504, and which is hereby incorporated by reference herein in its entirety. Improvements, however, are desired.

The optical fiber adapter mounting device described herein is configured to be mounted within a connection apparatus (e.g., a junction box) and facilitate the physical support and connection of two or more optical fibers. The adapter mounting device includes a mounting plate with a plurality of adapter holders pivotably coupled thereto. The adapter holders are independently pivotable relative to one another and are configured to support an adapter so that two connectors of the optical fibers can be aligned. The adapter holders are slidingly engaged with each other to form a compact arrangement that has increased strength to withstand the adapters and/or connectors being inserted and removed. In an aspect, each wall of the adapter holders have a recessed portion and an extension portion that slidably engages with an adjacent wall so as to increase the strength of the adapter mounting device. In another aspect, the extension portions, such as a lug and/or raised lip, are enlarged so as to increase durability and aid the independent pivotable movement between adapter holders.

Each adapter holder can be press fit or snap fit into the mounting plate for the pivotable connection. Additionally, the engagement between the adapter holders and the mounting plate increases the strength of the adapter mounting device and the alignment of the adapter holders. In an aspect, a dowel that defines the pivot axis of the adapter holder has increased durability. In another aspect, posts are provided to increase the strength and alignment of the adapter holders within the adapter mounting device. The adapter holders are also configured for use with a wide variety of adapter types, so that the adapter mounting device can be used for any number of connector types (e.g., SC, FC, ST, LC, etc.). In an aspect, the adapter holders have opposing walls with substantially rectangular shaped openings that can receive at least a portion of the adapter for securement. These openings allow the adapters to be quickly and easily inserted into, and removed from, the adapter holders.

Figure 1:
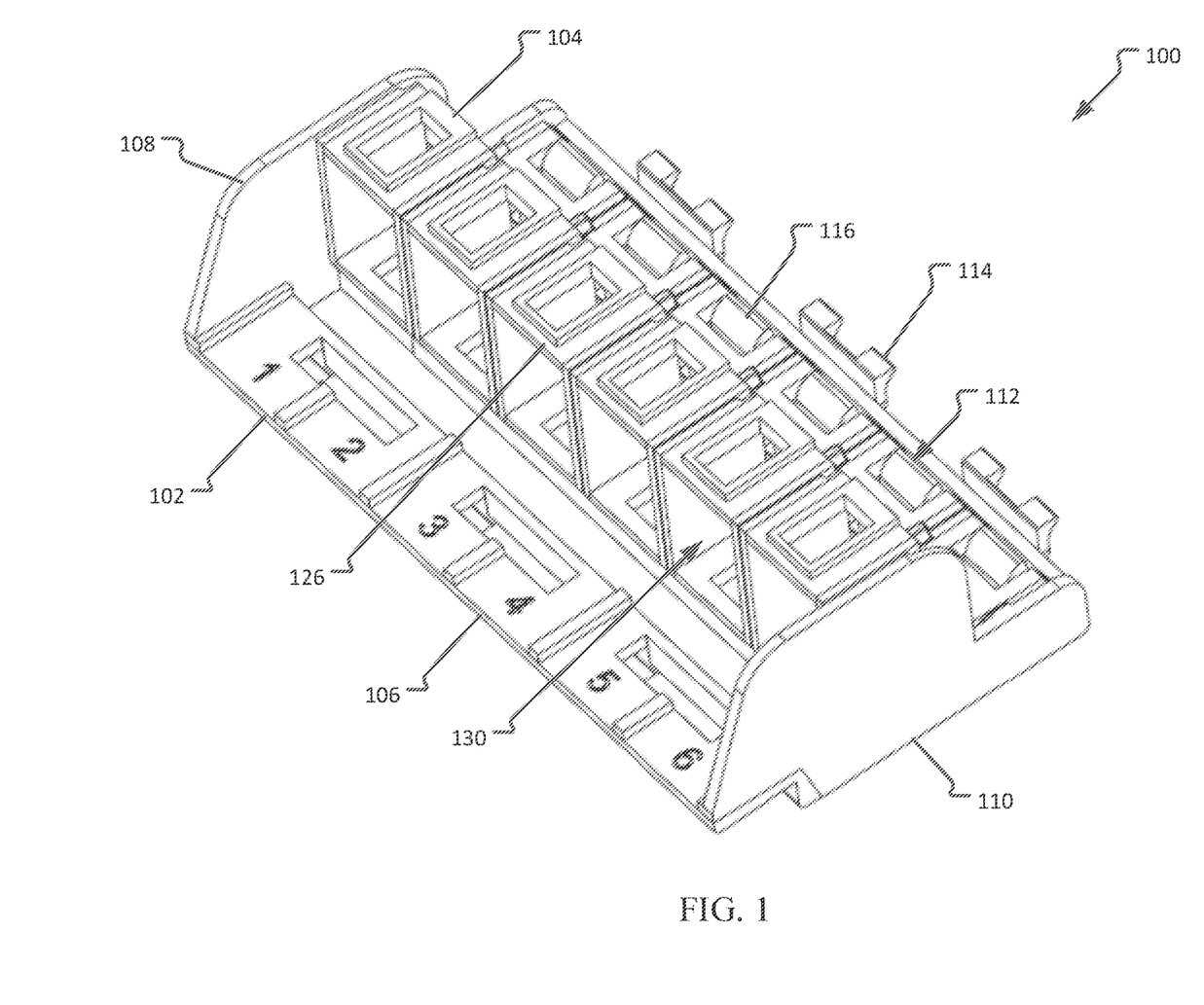
FIG. 1 is a perspective view of an exemplary optical fiber adapter mounting device.
Figure 2:
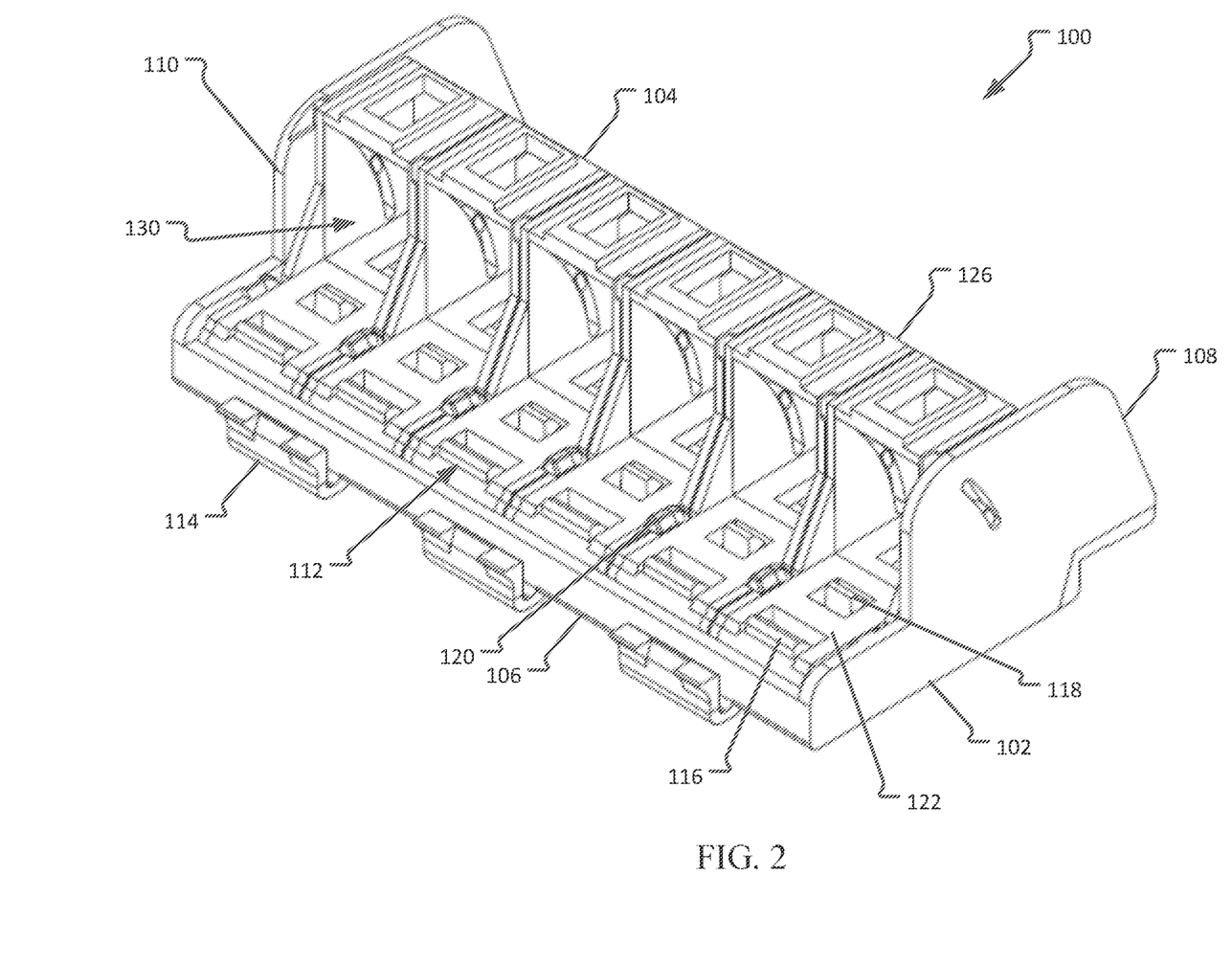
FIG. 2 is another perspective view of the optical fiber adapter mounting device.
Figure 3:
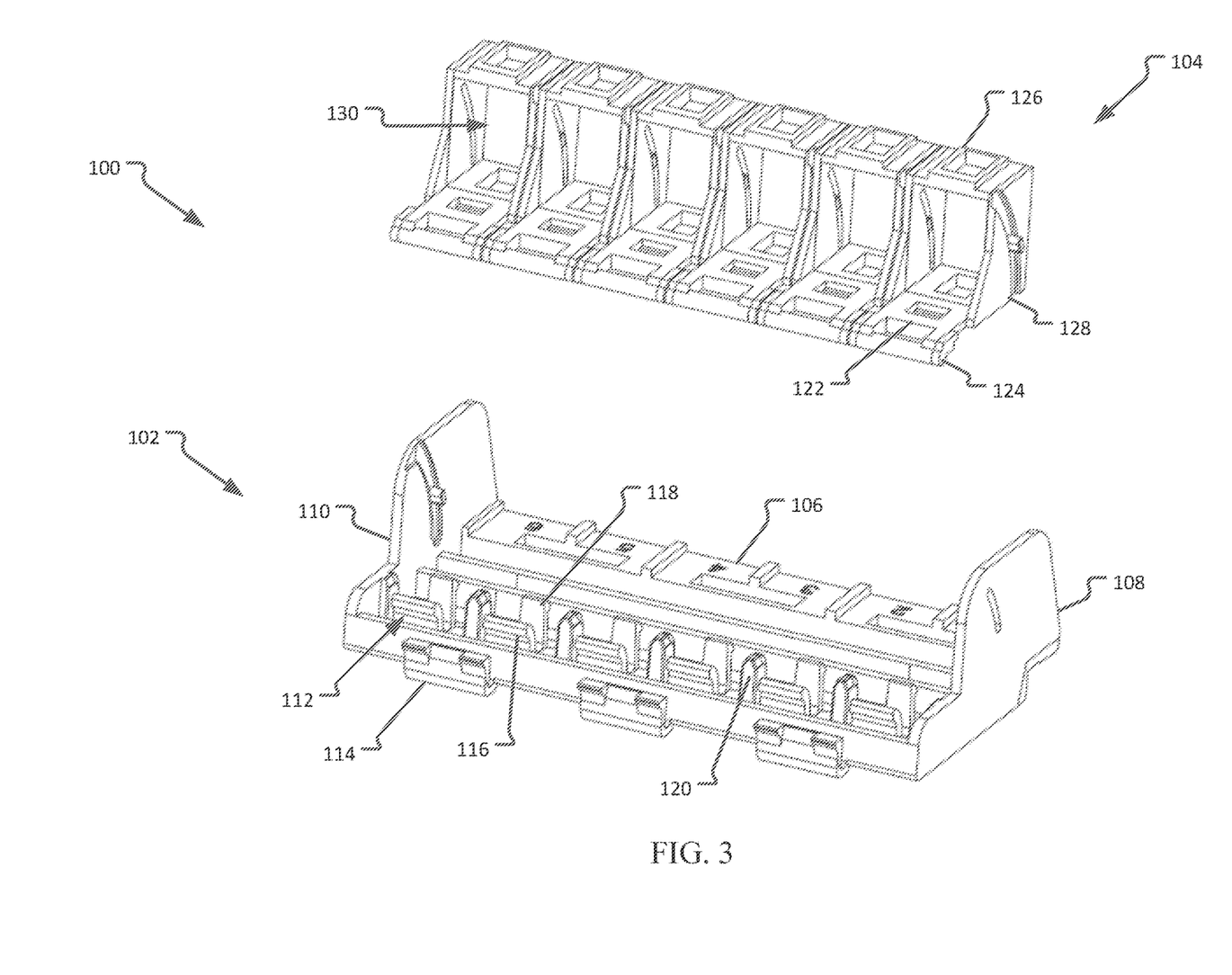
FIG. 3 is an exploded perspective view of the optical fiber adapter mounting device.

FIG. 1 is a perspective view of an exemplary optical fiber adapter mounting device 100. FIG. 2 is another perspective view of the optical fiber adapter mounting device 100. FIG. 3 is an exploded perspective view of the optical fiber adapter mounting device 100. Referring concurrently to FIGS. 1-3, the adapter mounting device 100 includes a mounting plate 102 and a plurality of adapter holders 104. Each of the adapter holders 104 are pivotally coupled to the mounting plate 102 and are configured to receive and support an optical fiber adapter 200 (shown in FIG. 10). Additionally, each of the adapter holders 104 are slidingly engaged with each other for structural support, however, each are also independently pivotable relative to one another. The adapter mounting device 100 allows for the optical fiber adapters 200 to be held such that connectors (not shown) are easily and smoothly inserted into and pulled out of the adapter 200, allows for compact arrangement of the adapters 200 to reduce the overall size of optical fiber connection apparatuses (e.g., junction boxes), and allows for different types of adapters 200 to be held so as to accommodate different connector and optical fiber cable types.

The mounting plate 102 includes a base 106, a first sidewall 108, and an opposite second sidewall 110. A plurality of mounts 112 are defined by the base 106 and are disposed between the first sidewall 108 and the second sidewall 110. Each adapter holder 104 is pivotally coupled to the base 106 at a corresponding mount 112. In the example, the mounting plate 102 includes six mounts 112 such that six adapter holders 104 are included in the adapter mounting device 100. It should be appreciated, however, that the adapter mounting device 100 can include any other number of adapter holders 104 and mounts 112 (e.g., one, two, three, four, five, seven, eight, etc.). The base 106 can include one or more snap clips 114 so that the adapter mounting device 100 can be coupled to an optical fiber connection apparatus (e.g., a junction box—not shown) as required or desired.

Each of the mounts 112 include a hold down 116 and a hook 118 spaced apart from one another. Additionally, a post 120 is disposed between each of the mounts 112. Each of the adapter holders 104 include a platform 122 having a first end 124 configured to pivotably couple to the mount 112 at the hold down 116 and a frame 126 disposed at a second end 128. The frame 126 defines a chamber 130 that is configured to receive at least a portion of the optical fiber adapter 200.

In operation, each adapter holder 104 is independently coupled to the base 106 such that each adapter holder 104 can independently pivot relative to the base 106. This movement enables the adapter 200 coupled thereto to be more efficiently positionable for receipt of a corresponding connector. Additionally, each adapter holder 104 is engaged with the adjacent adapter holder 104 and/or one of the sidewalls 108, 110. This engagement is a slidable engagement so that each adapter holder 104 is independently pivotable, however, because each adapter holder 104 is engaged with the adjacent adapter holder 104, lateral movement is restricted and the strength of the adapter mounting device 100 is increased. This structure increases the performance of the adapter mounting device 100 with regards to axial direction push/pull forces when mounting and securing adapters 200 and the corresponding connectors. As described herein, the axial direction forces that are induced by the insertion and/or removal of the adapter or connector is in a direction that extends along a longitudinal axis 186 of the adapter holder 104 (shown in FIG. 9). As such, by increasing the strength to resist these push/pull forces allows for adapters and connectors to be more easily secured within the adapter mounting device 100.

Figure 4:
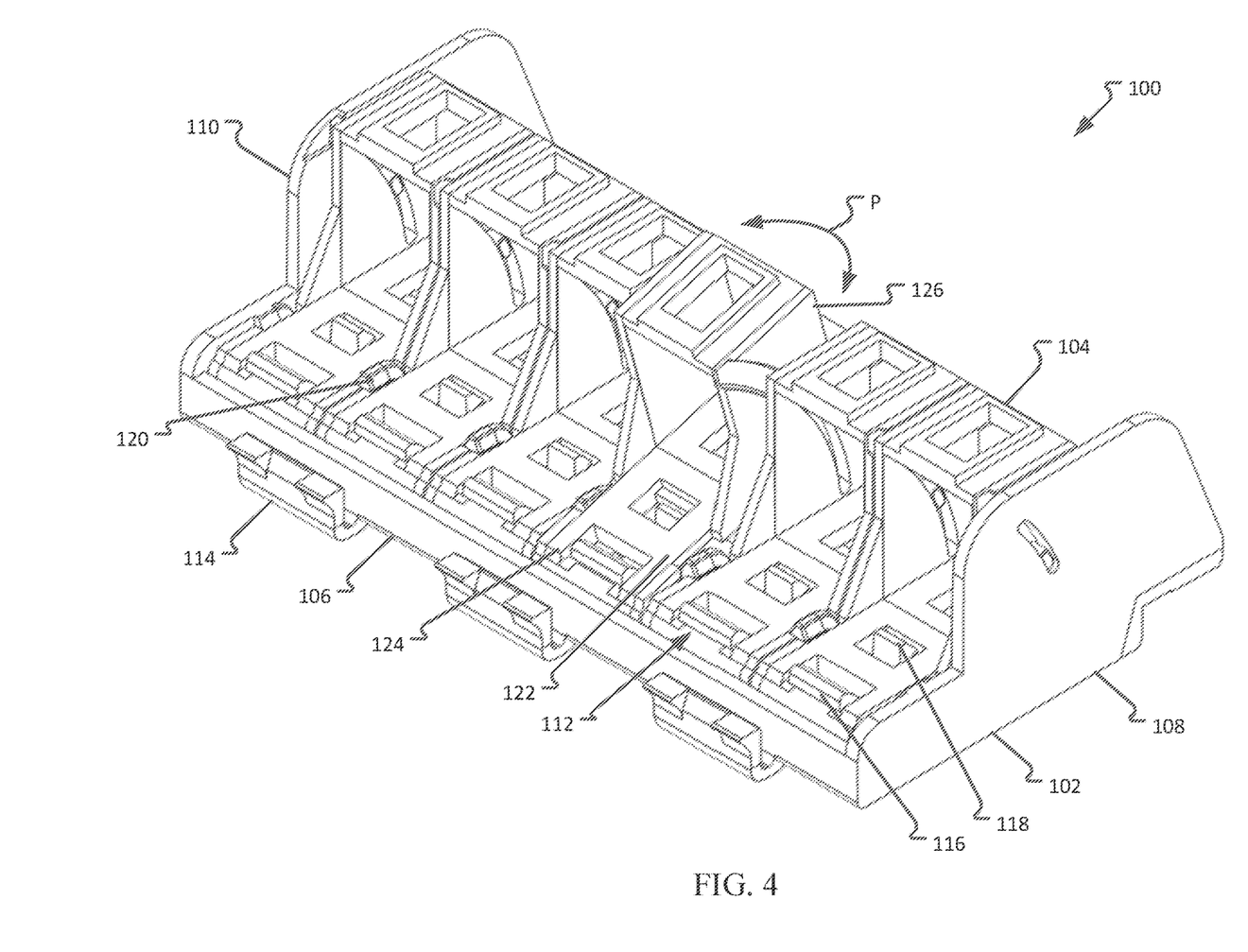
FIG. 4 is a perspective view of the optical fiber adapter mounting device with an adapter holder in a pivoted position.

FIG. 4 is a perspective view of the optical fiber adapter mounting device 100 with one adapter holder 104 in a pivoted position. Certain components are described above, and thus, are not necessarily described further. With continued reference to FIGS. 1 and 2, FIGS. 1 and 2 illustrate the adapter holder 104 in a first position whereby the platform 122 is disposed substantially parallel to the base 106. In the first position, the hook 118 can engage with the platform 122 so as to releasably secure the adapter holder 104. Each adapter holder 104 is independently pivotable P towards at least a second position whereby the second end 128 of the platform 122 is raised relative to the base 106 and the platform 122 is disposed at an angle. In an example, the angle is an acute angle and the pivot point is the first end 124 of the platform 122. This second position is illustrated in FIG. 4. In both the first position and the second position, each adapter holder 104 remains engaged with the adjacent adapter holder 104.

Figure 5:
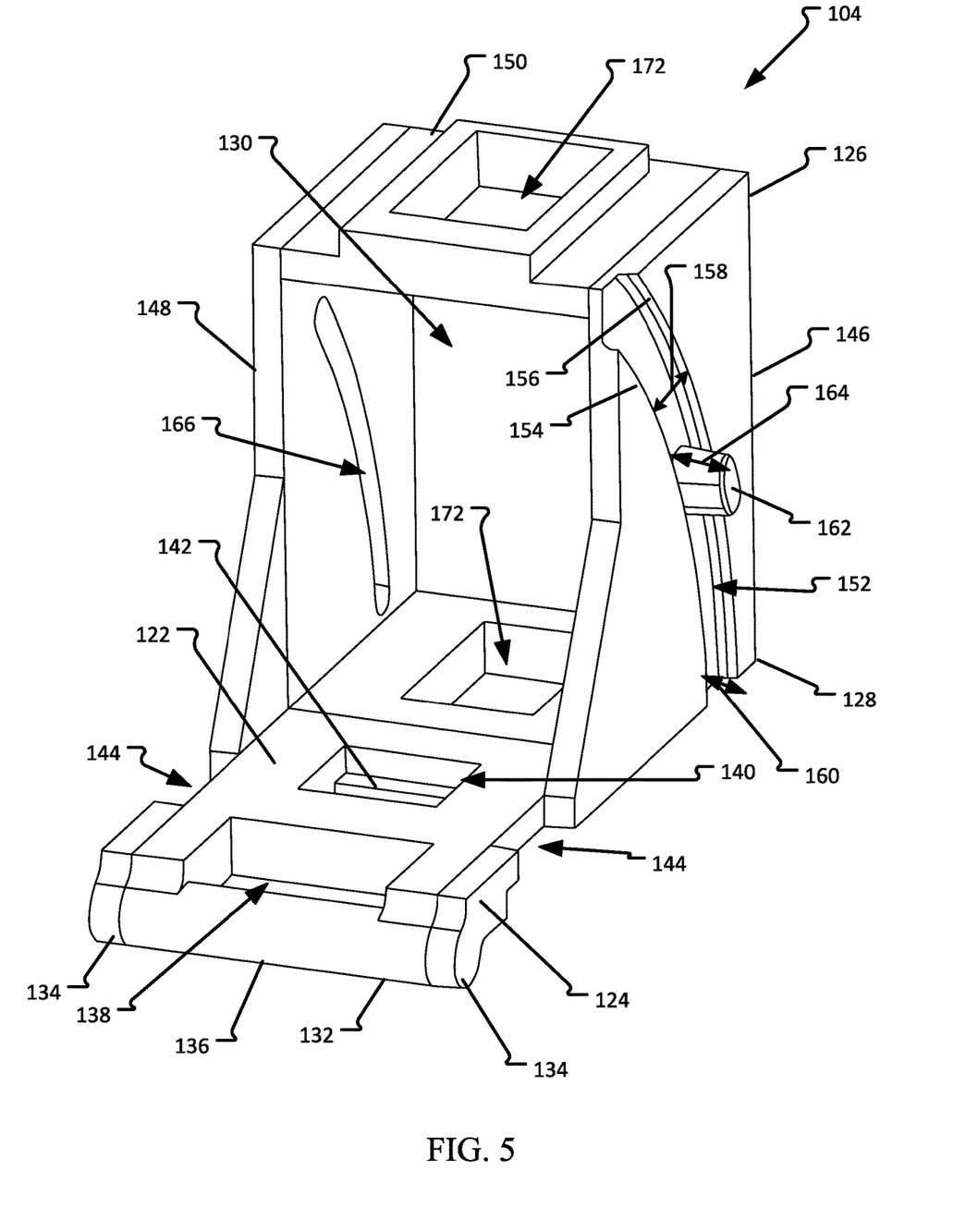
FIG. 5 is a perspective view of an exemplary adapter holder of the device shown in FIGS. 1-4.
Figure 6:
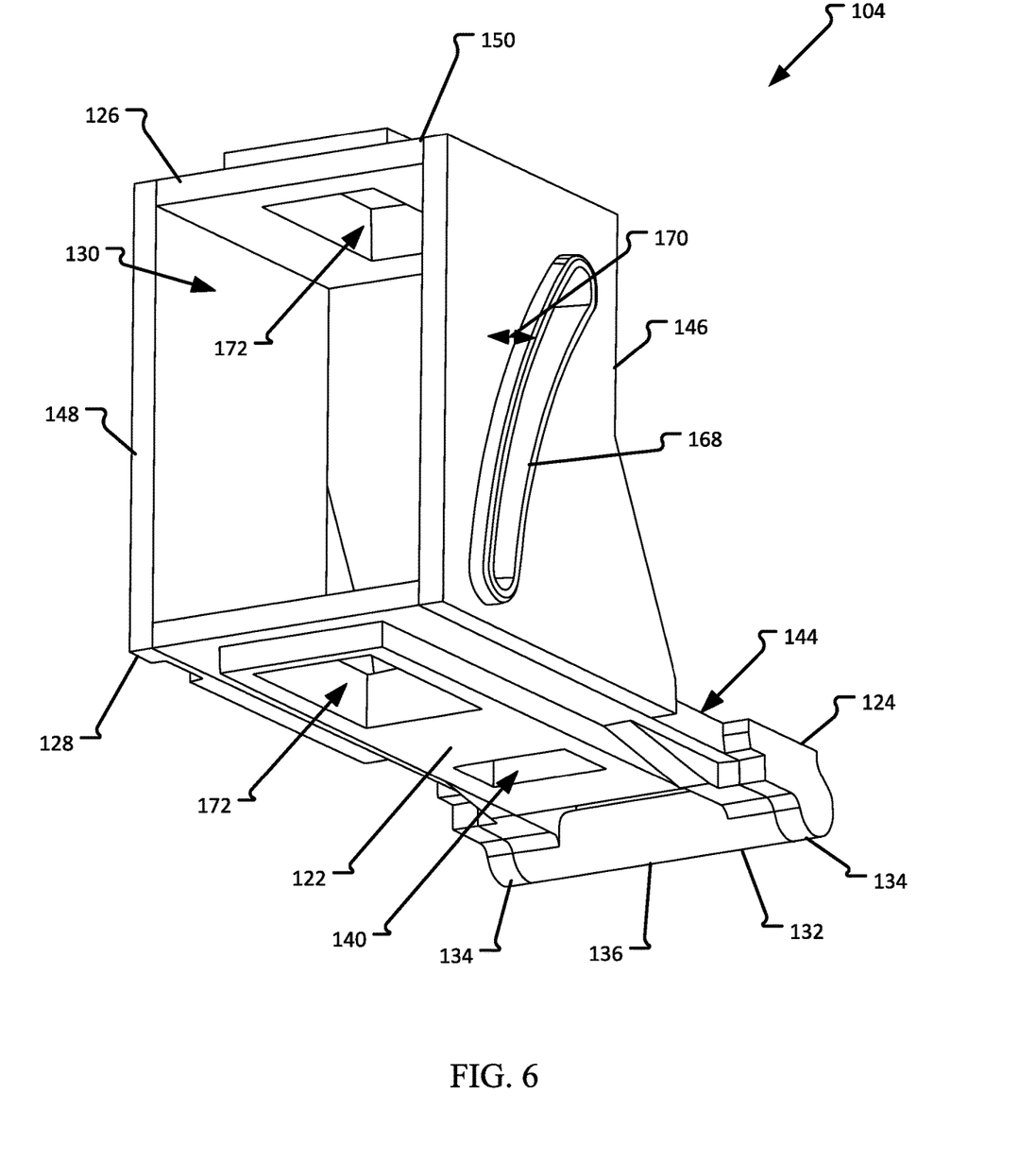
FIG. 6 is another perspective view of the adapter holder.

FIG. 5 is a perspective view of the adapter holder 104 of the optical fiber adapter mounting device 100 (shown in FIGS. 1-4). FIG. 6 is another perspective view of the adapter holder 104. Referring concurrently to FIGS. 5 and 6, the adapter holder 104 includes the platform 122 and the frame 126 that define the chamber 130 that is configured to receive at least a portion of the optical fiber adapter 200 (shown in FIG. 10). A dowel 132 is disposed at the first end 124 of the platform 122 and configured to pivotally engage with the hold down 116 of the mount 112 (shown in FIG. 3). Both ends 134 of the dowel 132 are coupled to the platform 122 such that a center portion 136 of the dowel 132 is spaced from the first end 124 of the platform 122 by a gap 138. The gap 138 is sized and shaped to at least partially receive the hold down 116 and enable the adapter holder 104 to pivot as described herein. In an aspect, the dowel 132 is disposed at least partially below the platform 122. By coupling the dowel 132 at the ends 134 to the platform 122, the structural strength of the dowel 132 increases when compared to utilizing cantilevered dowel ends for engagement. Additionally, the dowel 132 enables the adapter holder 104 to be easily press fit or snap fit within the corresponding mount 112.

The platform 122 also includes a cutout 140 disposed between the first end 124 and the second end 128. In an aspect, the cutout 140 is adjacent the gap 138 and positioned proximate the first end 124. The cutout 140 is sized and shaped to at least partially receive the hook 118 (shown in FIG. 3) and secure the adapter holder 104 in the first position (e.g., non-pivoted position). The hook 118 is at least partially resilient so that the hook 118 can disengage the cutout 140 and the adapter holder 104 can be allowed to pivot as required or desired. In an aspect, the cutout 140 includes a shoulder 142 that is configured to engage with the hook 118. The shoulder 142 is recessed within the cutout 140 so that when the hook 118 is engaged with the adapter holder 104 the hook 118 need not project above the platform 122.

A pair of outer notches 144 are also defined within the platform 122. In the example, the notches 144 are on the left and right sides of the platform 122 and are disposed between the dowel 132 and the frame 126. The notches 144 are sized and shaped to at least partially receive the post 120 (shown in FIG. 3) when the adapter holder 104 is in the first position. The engagement of the post 120 and the notches 144 increases the strength of the connection between the adapter holder 104 and the base 106 (shown in FIG. 3) in the axial direction (e.g., substantially parallel to the platform 122) and its resistance to axial push/pull forces from the adapter and connectors. Additionally, the adapter holder 104 engaging with the post 120 facilitates alignment of each of the adapter holder 104 such that its pivotable movement is more precise and the adapter holders 104 can be more compact within the mounting plate 102 (shown in FIG. 3).

In the example, the frame 126 includes a first wall 146, an opposite second wall 148, and a cross wall 150 disposed opposite of the platform 122. The first and second walls 146, 148 are configured to slidably engage with a wall of the adjacent adapter holder 104. The first wall 146 includes an arcuate channel 152 that extends between the cross wall 150 and the platform 122. The arcuate channel 152 has an inner radial wall 154 and an outer radial wall 156 with the channel 152 having a thickness 158 defined between the two walls 154, 156. Additionally, the channel 152 has a depth 160 that the channel 152 is defined within the first wall 146. In an example, the dowel 132 defines the origin point for the curvature of the walls 154, 156, and as such, the channel 152 is concave in a direction towards the first end 124 of the platform 122.

Additionally, a lug 162 is disposed at least partially within the arcuate channel 152 and projects from the surface of the first wall 146. The lug 162 is elongate and substantially centered within the channel 152 relative to the thickness 158 of the channel 152. In an aspect, the length of the lug 162 is substantially equal to, or greater than, twice its thickness. By elongating the lug 162, the strength of the engagement between two adjacent adapter holders 104 increases. Additionally, the elongated lug 162 can slide more easily relative to the adjacent adapter holder 104 for more precise movement. The lug 162 has an extension length 164 that is greater than the depth 160 of the channel 152 such that the lug 162 projects from the first wall 146.

The second wall 148 includes an arcuate slot 166 defined therein and with a raised lip 168 extending at least partially around a perimeter of the slot 166. In an aspect, the raised lip 168 fully extends around the entire perimeter of the slot 166. The raised lip 168 extends an extension length 170 from the surface of the second wall 148. In an aspect, the extension length 170 of the raised lip 168 is substantially equal to the depth 160 of the arcuate channel 152. In an example, the dowel 132 defines the origin point for the curvature of the slot 166, such that the slot 166 corresponds in curvature with the arcuate channel 152. The slot 166 is sized and shaped to at least partially receive the lug 162 and the raised lip 168 is sized and shaped to at least partially be received within the channel 152.

In operation, adjacent pairs of the adapter holder 104 have the first wall 146 directly adjacent to the second wall 148 and each wall is slidably engaged with one another. The lug 162 is at least partially received within the arcuate slot 166 and the raised lip 168 is at least partially received within the arcuate channel 152 such that adjacent adapter holders 104 can independently pivot. In an aspect, the circumferential length of the arcuate slot 166 at least partially defines the degree of pivotable movement of the adapter holder 104. With each wall 146, 148 having an extension component (e.g., lug 162 or raised lip 168) and a recessed component (e.g., channel 152 or slot 166), the engagement between adjacent walls increases so as to increase the strength of the adapter holder device (e.g., to increase resistance to axial push/pull forces) while still enabling independent pivoting movement of the adapter holders 104. During assembly of the adapter holders 104 onto the base 106 (shown in FIG. 3), the adapter holders 104 can be press fit or snap fit into the corresponding mount. Additionally, the open ends of the arcuate channel 152 allow for the adjacent walls 146, 148 to be more easily slidably engaged during assembly.

Figure 10:
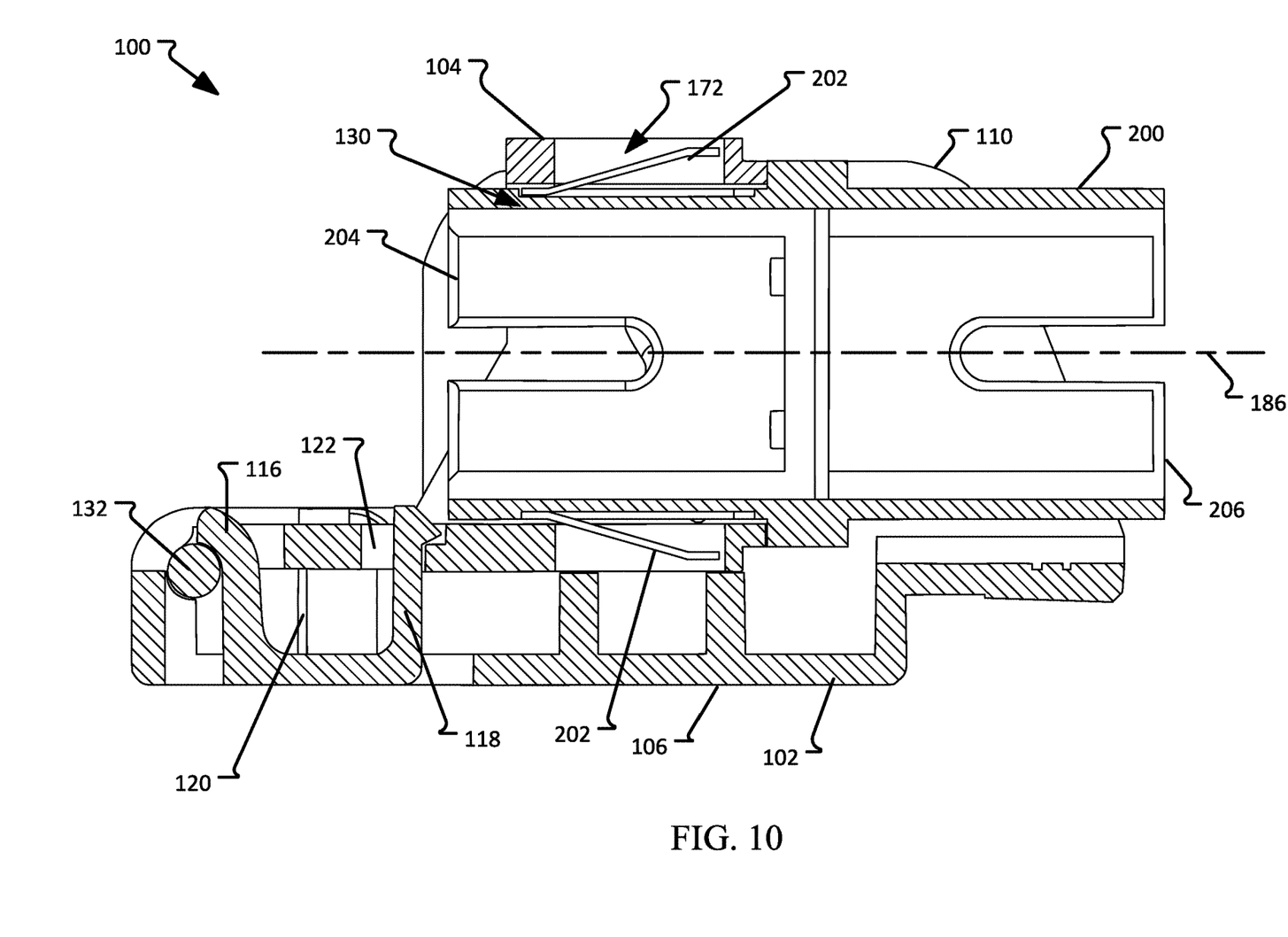
FIG. 10 is another cross-sectional view of the device shown in FIGS. 1-4 and with an optical fiber adapter.

Additionally, the platform 122 and the cross wall 150 each include an opening 172 that is configured to receive a spring clip 202 of the optical fiber adapter 200 (both shown in FIG. 10). In the example, the openings 172 are substantially rectangular in shape and extend completely through the platform 122 and the cross wall 150. By having full openings 172, adapter 200 connection and removal from the adapter holder 104 is made more efficient. Additionally, the adapter holder 104 can be used with any number of different types of adapters 200 so that the adapter mounting device can be used for many different types of optical fiber connector types. In other examples, the openings 172 may take the form of a recess, and thus, covered on the outside of the frame 126.

Figure 7:
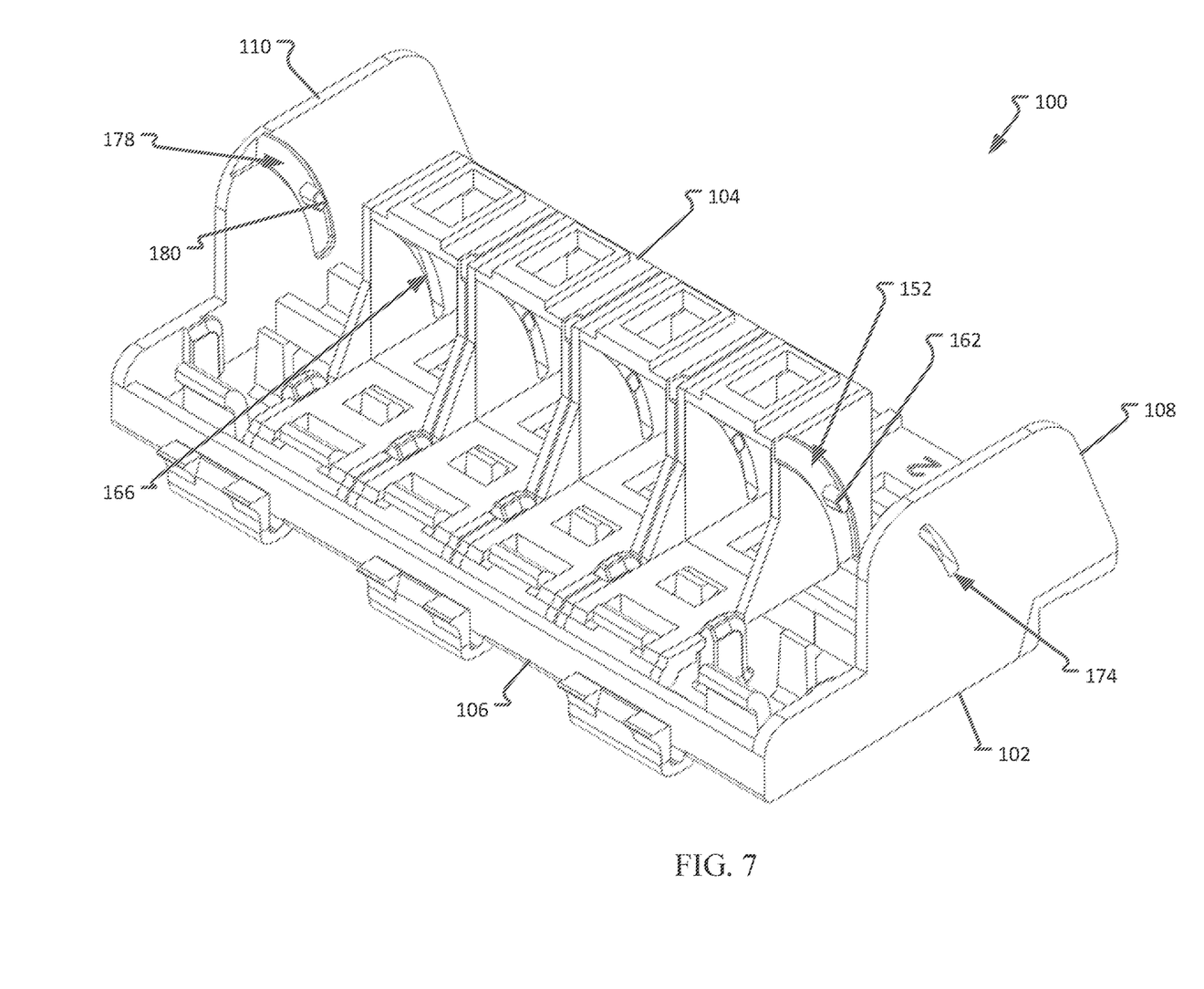
FIG. 7 is a partial perspective view of the device shown in FIGS. 1-4.
Figure 8:
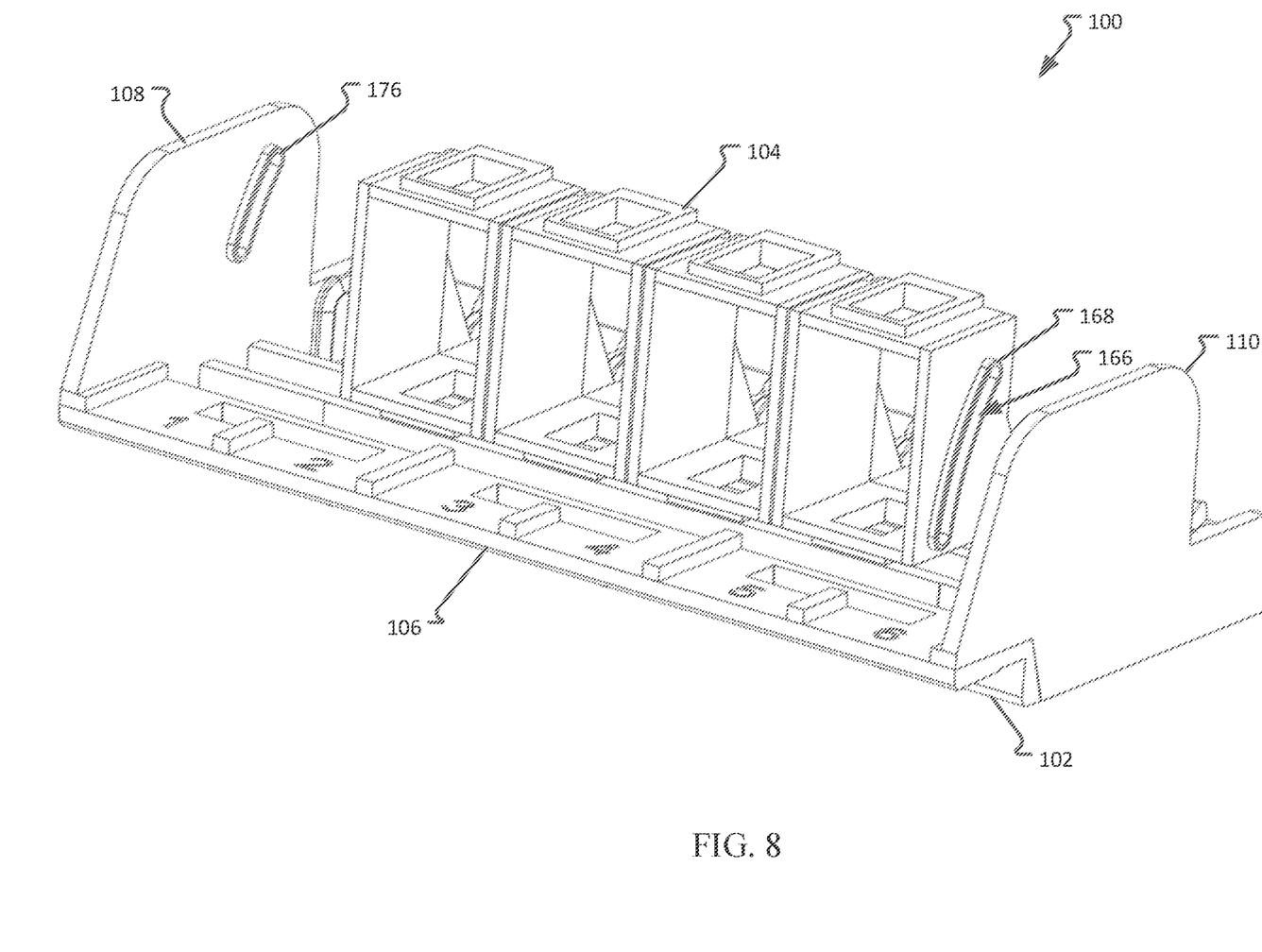
FIG. 8 is another partial perspective view of the device shown in FIGS. 1-4.

FIG. 7 is a partial perspective view of the optical fiber adapter mounting device 100. FIG. 8 is another partial perspective view of the optical fiber adapter mounting device 100. Referring concurrently to FIGS. 7 and 8, the outside adapter holders 104 are removed. These outside adapter holders 104 slidably engage with the sidewalls 108, 110 of the mounting plate 102 with corresponding structure to the features on the adapter holders 104. In the example, the first sidewall 108 of the mounting plate 102 includes an arcuate slot 174 defined therein and with a raised lip 176 extending at least partially around a perimeter of the slot 174. In an aspect, the raised lip 176 fully extends around the entire perimeter of the slot 174. The lug 162 of the adapter holder 104 is at least partially received within the arcuate slot 174 and the raised lip 176 is at least partially received within the arcuate channel 152 of the adapter holder 104 such that the adapter holder 104 can pivot relative to the sidewall 108 as well as being secured therein. In an aspect, the slot 174 and lip 176 of the mounting plate 102 are substantially the same size and shape as the slot 166 and the lip 168 of the adapter holder 104.

The second sidewall 110 of the mounting plate 102 includes an arcuate channel 178 that extends downward from the top of the sidewall towards the base 106. A lug 180 is disposed at least partially within the arcuate channel 178 and projects from the surface of the sidewall 110. The lug 180 is at least partially received with the arcuate slot 166 of the adapter holder 104 and the channel 178 at least partially receives the raised lip 168 of the adapter holder 104 such that the adapter holder 104 can pivot relative to the sidewall 110 as well as being secured therein. In an aspect, the channel 178 and the lug 180 of the mounting plate 102 are substantially the same size and shape as the channel 152 and lug 162 of the adapter holder 104.

Figure 9:
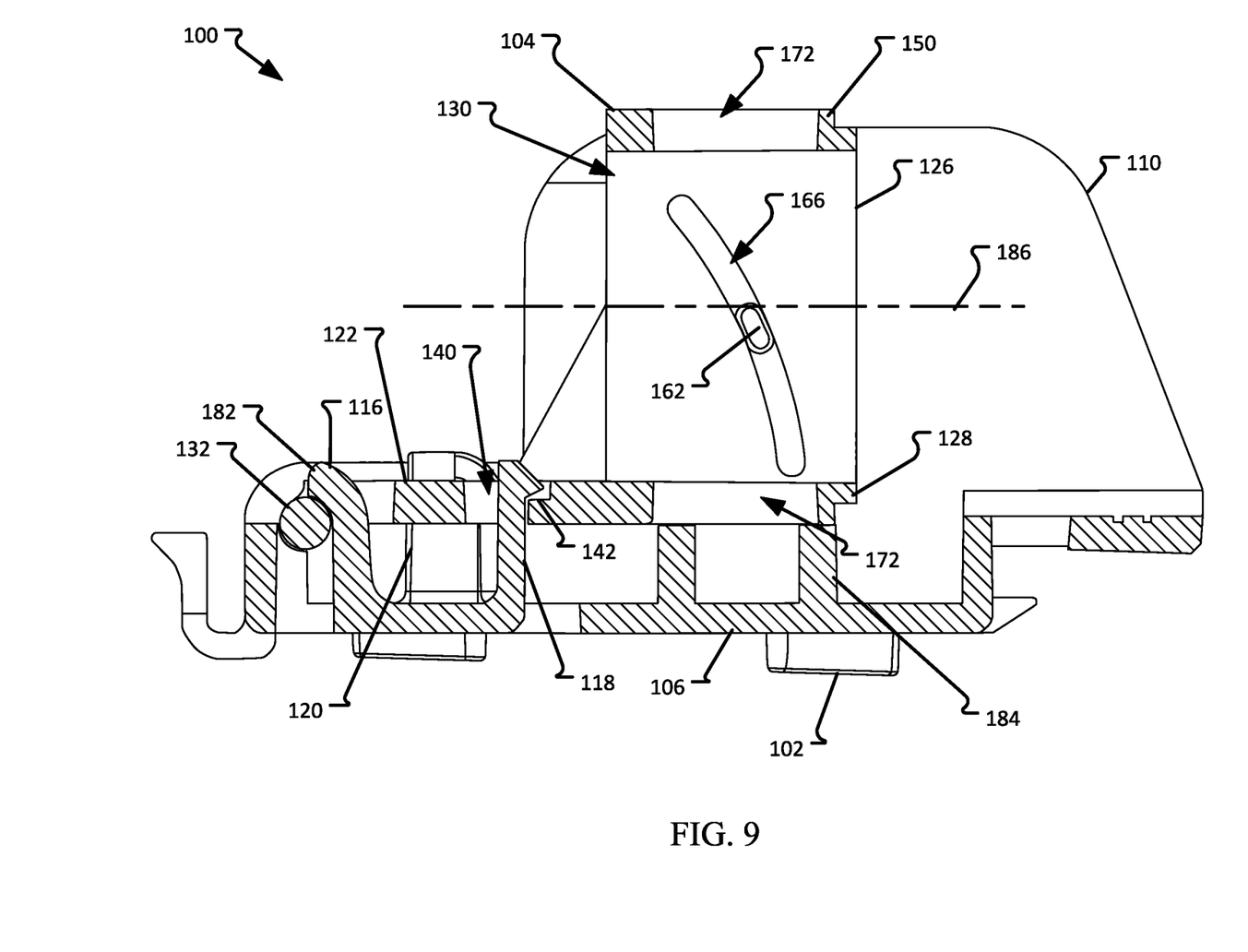
FIG. 9 is a cross-sectional view of the device shown in FIGS. 1-4.

FIG. 9 is a cross-sectional view of the optical fiber adapter mounting device 100. Certain components are described above, and thus, are not necessarily described further. As illustrated in FIG. 1, the adapter holder 104 is in the first position such that the platform 122 is secured to the base 106 by the hook 118 and pivotable movement is restricted. In the first position, the hook 118 engages with the shoulder 142 of the cutout 140 within the platform 122. The dowel 132 defines the rotation axis of the adapter holder 104 and is pivotably engaged with the base 106 at the hold down 116. The hold down 116 includes a nose 182 that has a curved surface that corresponds in shape to the dowel 132. In an aspect, the nose 182 and the hook 118 extend in opposing directions on the base 106. The hold down 116 and the hook 118 enable the adapter holder 104 to be easily press fit or snap fit into the mounting plate 102 during assembly. The base 106 may also include one or more partial walls 184 that provide support for the second end 128 of the platform 122 when the adapter holder 104 is in the first position.

The chamber 130 of the adapter holder 104 defines a longitudinal axis 186 that is substantially parallel to the platform 122. The longitudinal axis 186 defines an insertion and removal direction of the adapter 200 (shown in FIG. 10) when being coupled to the adapter holder 104. Additionally, the longitudinal axis 186 defines an insertion and removal direction of the connectors (not shown) that couple to the adapter 200. As such, the optical fiber adapter mounting device 100, including the mounting plate 102 and the adapter holders 104, are configured to withstand the axial push/pull forces acting along the longitudinal axis 186 from the insertion and removal of the adapter 200 and/or the connectors. For example, the post 120 engages with the side notches of the platform 122 so as to aid in the alignment of the adapter holders 104 and to provide increased support within the device 100 during axial push/pull forces when the adapter 200 and/or the connectors are connected. In another example, each wall of the frame 126 of the adapter holder 104 includes a recessed portion and an extension portion that slidably engages with an adjacent wall so as to increase lateral stability of the adapter holder 104 (in both the first and second positions) and to provide increased support within the device 100 during axial push/pull forces. In yet another example, the enlarged lugs 162 provide increased strength and durability, while aiding the pivotable movement of the adapter holders 104.

FIG. 10 is another cross-sectional view of the optical fiber adapter mounting device 100 with an optical fiber adapter 200. Certain components of the adapter mounting device 100 are described above, and thus, are not necessarily described further. The adapter 200 is used to couple two connectors (not shown) of optical fibers together. For example, the adapter 200 is configured to couple two SC-type connectors together. It is appreciated, that the adapter 200 can be any other type of connector adapter as required or desired. In the example, the adapter 200 includes spring clips 202 that are used to retain the adapter 200 within the chamber 130 of the adapter holder 104 of the device 100. The spring clips 202 can be disposed on opposite sides of the adapter 200. In the example, the spring clips 202 are at least partially received by the openings 172 of the adapter holder 104. The adapter 200 includes a first end 204 and an opposite second end 206. Both ends 204, 206 are configured to receive a connector, and as such, the adapter holder 104 supports the adapter 200 so that the ends 204, 206 are unobstructed in both the first and second positions.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed is:

1. An optical fiber adapter mounting device comprising:
   a mounting plate comprising:
      a base;
      a first sidewall and an opposite second sidewall; and
      a plurality of mounts defined by the base and disposed between the first sidewall and the second sidewall, wherein each of the plurality of mounts comprise a hold down and a hook; and
   a plurality of adapter holders, wherein each of the plurality of adapter holders are pivotally coupled to the mounting plate at a corresponding mount of the plurality of mounts and configured to support an optical fiber adapter, wherein each of the plurality of adapter holders comprise:
      a platform comprising a first end, an opposite second end, and a cutout disposed between the first end and the second end;
      a dowel disposed at the first end, wherein both ends of the dowel are coupled to the platform such that a center portion of the dowel is spaced from the first end of the platform by a gap, wherein the hold down at least partially extends through the gap to pivotally engage the dowel such that the platform is pivotable between at least a first position, whereby the platform is disposed substantially parallel to the base, and a second position, whereby the second end is raised relative to the base, and wherein the hook is selectively receivable at least partially within the cutout when the platform is in the first position; and
      a frame disposed at the second end and defining a chamber that receives at least a portion of the optical fiber adapter.

2. The optical fiber adapter mounting device of claim 1, wherein the hold down comprises a nose having a curved surface corresponding to the size and shape of the dowel.

3. The optical fiber adapter mounting device of claim 2, wherein the nose and the hook extend in opposing directions.

4. The optical fiber adapter mounting device of claim 1, wherein the base further comprises a post disposed between each of the plurality of mounts.

5. The optical fiber adapter mounting device of claim 4, wherein the platform further comprises at least one outer notch disposed between the dowel and the frame, and wherein the at least one outer notch is configured to at least partially receive the post when the platform is in the first position.

6. The optical fiber adapter mounting device of claim 1, wherein the frame comprises a first wall having a lug, an opposite second wall having an arcuate slot, and a cross wall opposite of the platform, and wherein adjacent adapter holders are slidably engaged with each other via the slot receiving at least a portion of the lug.

7. The optical fiber adapter mounting device of claim 1, wherein the frame comprises a first wall, an opposite second wall, and a cross wall opposite of the platform, and wherein the platform and the cross wall each comprise an opening configured to receive a spring clip of the optical fiber adapter.

8. An optical fiber adapter mounting device comprising:
a mounting plate comprising:
a base;
a first sidewall comprising a sidewall lug;
a second sidewall comprising a sidewall arcuate slot; and
a plurality of mounts defined by the base and disposed between the first sidewall and the second sidewall; and
a plurality of adapter holders, wherein each of the plurality of adapter holders are pivotally coupled to the mounting plate at a corresponding mount of the plurality of mounts and configured to support an optical fiber adapter, wherein each of the plurality of adapter holders comprise:
a platform comprising a first end pivotally coupled to the corresponding mount and an opposite second end, wherein the platform is pivotable between at least a first position, whereby the platform is disposed substantially parallel to the base, and a second position, whereby the second end is raised relative to the base; and
a frame disposed at the second end and defining a chamber that receives at least a portion of the optical fiber adapter, wherein the frame comprises:
a first wall comprising a wall arcuate channel and a wall lug, wherein the wall lug is disposed at least partially within the wall arcuate channel;
an opposite second wall comprising a wall arcuate slot having a wall raised lip extending at least partially around a perimeter of the wall arcuate slot, wherein between adjacent pairs of the plurality of adapter holders, the first wall is disposed adjacent the second wall, and the wall arcuate channel and wall lug are slidably engaged at least partially with the wall arcuate slot and the wall raised lip; and
a cross wall opposing the platform.

9. The optical fiber adapter mounting device of claim 8, wherein the wall arcuate channel extends fully between the cross wall and the platform on the first wall.

10. The optical fiber adapter mounting device of claim 8, wherein the wall arcuate channel has a depth that is substantially equal to an extension length of the wall raised lip.

11. The optical fiber adapter mounting device of claim 10, wherein the wall lug has an extension length that is greater than the depth of the wall arcuate channel.

12. The optical fiber adapter mounting device of claim 8, wherein the first sidewall further comprises a sidewall arcuate channel and the sidewall lug is disposed at least partially within the sidewall arcuate channel, and wherein the sidewall arcuate channel and the sidewall lug are slidably engaged at least partially with the wall arcuate slot and the wall raised lip.

13. The optical fiber adapter mounting device of claim 8, wherein the second sidewall further comprises a sidewall raised lip extending at least partially around a perimeter of the sidewall arcuate slot, and wherein the sidewall arcuate slot and the sidewall raised lip are slidably engaged at least partially with the wall arcuate channel and the wall lug.

14. The optical fiber adapter mounting device of claim 8, wherein the wall lug is elongated.

15. The optical fiber adapter mounting device of claim 8, wherein each mount of the plurality of mounts comprise a hold down, and the first end of the platform comprises a dowel with a central portion spaced with a gap from the first end, wherein the hold down is at least partially received within the gap to pivotally engage the dowel.

16. The optical fiber adapter mounting device of claim 8, wherein the base further comprises a post disposed between each of the plurality of mounts, and the platform comprises at least one notch configured to at least partially receive the post when the platform is in the first position.

17. The optical fiber adapter mounting device of claim 8, wherein the platform and the cross wall each comprise an opening configured to receive a spring clip of the optical fiber adapter.

18. An optical fiber adapter mounting device comprising:
a mounting plate comprising:
a base;
a first sidewall and an opposite second sidewall; and
a plurality of mounts defined by the base and disposed between the first sidewall and the second sidewall; and
a plurality of adapter holders, wherein each of the plurality of adapter holders are pivotally coupled to the mounting plate at a corresponding mount of the plurality of mounts and configured to support an optical fiber adapter, wherein each of the plurality of adapter holders comprise:
a platform comprising a first end pivotally coupled to the corresponding mount and an opposite second end, wherein the platform is pivotable between at least a first position, whereby the platform is disposed substantially parallel to the base, and a second position, whereby the second end is raised relative to the base; and
a frame disposed at the second end and defining a chamber that receives at least a portion of the optical fiber adapter, wherein the frame comprises a first wall, an opposite second wall, and a cross wall opposite of the platform, and wherein the platform and the cross wall each comprise an opening configured to receive a spring clip of the optical fiber adapter.

19. The optical fiber adapter mounting device of claim 18, wherein each mount of the plurality of mounts comprise a hold down, and the first end of the platform comprises a dowel with a central portion spaced with a gap from the first end, wherein the hold down is at least partially received within the gap to pivotally engage the dowel.

20. The optical fiber adapter mounting device of claim 18, wherein the base further comprises a post disposed between each of the plurality of mounts, and the platform comprises at least one notch configured to at least partially receive the post when the platform is in the first position.

21. The optical fiber adapter mounting device of claim 18, wherein the first wall comprises an arcuate channel and an elongated lug and the second wall comprises an arcuate slot having a raised lip extending around a perimeter of the arcuate slot, and wherein a pair of adjacent adapter holders of the plurality of adapter holders have the elongated lug and the arcuate channel slidably engaged at least partially with the arcuate slot and the raised lip.

22. The optical fiber adapter mounting device of claim 18, wherein the first sidewall comprises an arcuate channel and an elongate lug slidably engaged at least partially with the second wall, and the second sidewall comprises an arcuate slot having a raised lip extending around a perimeter of the arcuate slot slidably engaged at least partially with the first wall.

23. The optical fiber adapter mounting device of claim 18, wherein the first wall and the second wall each have a recessed portion and an extension portion that is configured to slidably engage with an adjacent adapter holder of the plurality of adapter holders.

24. The optical fiber adapter mounting device of claim 18, wherein the openings are substantially rectangular in shape.

* * * * *